US008383055B2

(12) United States Patent
Palmer

(10) Patent No.: US 8,383,055 B2
(45) Date of Patent: Feb. 26, 2013

(54) ANCHOR SYSTEM FOR REFRACTORY LINING

(75) Inventor: Greg Palmer, Coorparoo DC (AU)

(73) Assignee: Palmer Linings Pty Ltd., Brisbane (AU)

( * ) Notice: Subject to any disclaimer, the term of this patent is extended or adjusted under 35 U.S.C. 154(b) by 260 days.

(21) Appl. No.: 12/635,052

(22) Filed: Dec. 10, 2009

(65) Prior Publication Data

US 2010/0119425 A1 May 13, 2010

Related U.S. Application Data

(63) Continuation-in-part of application No. PCT/AU2008/000860, filed on Jun. 13, 2008.

(30) Foreign Application Priority Data

Jun. 15, 2007 (AU) ................................ 2007903234

(51) Int. Cl.
*B01J 19/00* (2006.01)
*B65D 25/00* (2006.01)

(52) U.S. Cl. ...................... 422/241; 422/310; 220/62.15

(58) Field of Classification Search .................. 422/241, 422/310; 220/592.2, 62.15
See application file for complete search history.

(56) References Cited

U.S. PATENT DOCUMENTS

| | | | | |
|---|---|---|---|---|
| 3,449,084 | A | 6/1969 | Smoot et al. | |
| 3,587,198 | A * | 6/1971 | Hensel | 52/745.09 |
| 3,712,012 | A * | 1/1973 | Meyer et al. | 52/249 |
| 4,222,337 | A * | 9/1980 | Christiansen | 110/336 |
| 4,289,479 | A * | 9/1981 | Johnson, Jr. | 432/3 |
| 4,490,333 | A | 12/1984 | Humphries et al. | |

FOREIGN PATENT DOCUMENTS

| | | | |
|---|---|---|---|
| DE | 4428123 | A1 | 2/1996 |
| GB | 1386407 | A | 3/1975 |
| JP | 2-147797 | | 12/1990 |
| JP | 4-43799 | | 4/1992 |
| JP | 05-099826 | | 1/1994 |
| JP | 09-351324 | | 7/1999 |
| JP | 2000-193374 | | 7/2000 |
| JP | 2004-248986 | | 3/2006 |

OTHER PUBLICATIONS

Machine translation of DE4428123 A1-Jul. 14, 2011.*

* cited by examiner

*Primary Examiner* — Walter D Griffin
*Assistant Examiner* — Huy-Tram Nguyen
(74) *Attorney, Agent, or Firm* — Greer, Burns & Crain, Ltd.

(57) ABSTRACT

An anchoring system is provided for supporting a double-layered refractory lining of a process vessel. The refractory lining includes a first layer positioned adjacent to an inner surface of the process vessel and a second layer positioned adjacent to the first layer. The anchoring system has a plurality of bifurcated anchors extending from the internal surface of the process vessel through the first layer and into the second layer of the double-layered lining adjacent the first layer wherein the plurality of bifurcated anchors have a bifurcation disposed within the second layer.

19 Claims, 7 Drawing Sheets

ANCHOR SYSTEM FOR REFRACTORY LINING

RELATED APPLICATION

The present application is a Continuation-In-Part of, and claims priority under 35 USC §120 from PCT/AU2008/000860 filed Jun. 13, 2008, which claims priority from Australian Patent application No. 2007903234 filed Jun. 15, 2007.

FIELD OF THE INVENTION

The present invention relates to anchors for the lining of a process vessel. In particular, the present invention relates to anchors for supporting a double-layered lining of a process vessel.

BACKGROUND OF THE INVENTION

Process vessels lined with refractory concrete, bricks and other ceramic materials are used in a number of applications including in the cement, petroleum, petrochemicals, mineral processing, alumina and other industries. Such process vessels typically comprise an outer shell (usually made from steel or other metal) having a refractory lining. From time to time the linings break down and need to be replaced or repaired. Failure in the lining of a process vessel includes de-bonding of the refractory layers, failure of anchor supports, delamination, voiding, cracking or honeycombing in the refractory layers, and the like.

In order to maintain process vessels that are lined with refractory materials, it is generally necessary for the process vessels to be taken offline and the refractory lining to be inspected and then repaired or replaced as necessary. Taking a process vessel offline for the inspection and repair of refractory linings results in a significant loss of productivity. Certain process vessels may take many hours, or even days, to cool sufficiently or to be in a condition for inspection and repair. The inspection and repair of the refractory lining is also a potentially hazardous operation. Operators enter a process vessel in order to inspect and determine the condition of the lining. Incidents have occurred where linings have fallen from a process vessel while an operator has been inside the vessel. It is desirable to minimize the need for repair of refractory lined vessels.

Process vessels are often lined with a double layer lining system which incorporates an insulation layer and a hot face layer. The insulation layer is supported against the internal wall of the process vessel by refractory anchors. A hot face layer is supported against the insulation layer and again supported by the refractory anchors.

The anchors used for supporting the lining system are generally formed from steel bars and are often V or Y shaped. The V-shaped anchors have their respective arms extending divergently through the insulation layer and into the hot face layer.

In an alternate system for supporting a double layer lining, Y-shaped refractory anchors have also been used. In use, these Y-shaped anchors are attached to the process vessel and extend into the lining. The double-layered lining is cast so that the bifurcation, or apex of the Y, is embedded within the insulation layer or at the interface between the insulation layer and the hot face layer.

Whilst these anchors provide a useful and effective anchoring system for supporting a double-layered lining, the high cost of replacement of the lining, particularly in terms of the downtime of the process vessel, means that more reliable and effective anchoring systems are needed to improve the efficiency of the operation of the process vessels.

The failure of refractory anchors, such as steel refractory anchors, in process vessels, particularly in two layer lining systems (insulation and hot face) generally results from two dominant failure modes that can be described as a creep rupture and yielding.

Creep rupture is due to a small constant load on the anchor and this could be the weight of the refractory castable and/or the thermal load during operation. Creep rupture stress is the load in 1,000, 10,000 or 100,000 hours that will result in failure of the anchor. The higher the load and the higher the temperature, means the time to failure will decrease. Yielding of the anchor is due to an excessive load applied to the anchor during operation. It is normally associated with movement of the hot face castable due to missing or incorrect support/restraint of the castable.

We have now found an anchoring system for a double layer refractory lining for a process vessel that reduces the failure rate of double layer refractory linings and that overcomes or alleviates at least one of the above disadvantages. Other objects and advantages of the invention will become apparent from the following description.

SUMMARY OF THE INVENTION

In accordance with a first aspect of the present invention there is provided an anchoring system for supporting a double-layered refractory lining of a process vessel comprising a first layer positioned adjacent to an inner surface of the process vessel and a second layer positioned adjacent to the first layer, wherein the anchoring system comprises a plurality of bifurcated anchors extending from the internal surface of the process vessel through the first layer and into the second layer of the double-layered lining adjacent the first layer wherein said plurality of bifurcated anchors have a bifurcation disposed within the second layer.

In some embodiments, the bifurcation point is located in the second layer and spaced from the interface between the first layer and the second layer. The present inventor has found that best results are achieved where the bifurcation point is positioned as far away as possible from the interface between the first layer and the second layer. However, it will be understood that-the bifurcation point or the tips of the anchors should not be positioned too close to the exposed surface of the second layer. It will be understood that the exposed surface of the second layer forms the hot face during use. If the bifurcation point or the tips of the anchors are positioned too close to the hot face, they are exposed to higher temperatures, which can result in increased corrosion or oxidation of the anchor. In some embodiments, the bifurcation point (as measured from the anchor vertex) is positioned in the second layer at a distance away from the interface between the first layer and the second layer, with the distance being equivalent to at least 15% of the thickness of the second layer, more preferably from 15% to 75% of the thickness of the second layer. It is also desirable that the tips of the anchor (or indeed, any part of the anchor that is located furtherest away from the inner surface of the process vessel) are positioned below the exposed surface of the second layer at a distance of at least 20% of the thickness of the second layer away from the exposed surface of the second layer.

In some embodiments, the anchoring system further comprises a plurality of other anchors extending from an inner surface of the process vessel into the first layer.

In other embodiments, the anchoring system may further comprise one or more stiffeners mounted to the inner surface of the process vessel. The stiffeners may comprise one or more stiffening plates extending from the inner surface of the process vessel into the first or second layer. The one or more stiffeners may be mounted to the inner surface of the process vessel, for example, by welding.

In yet a further embodiment, the anchoring system comprises a combination of anchors and stiffening plates, the stiffening plates extending from an internal surface of the process vessel into the first or second layer of the double-layered lining adjacent the internal surface of the process vessel and the anchors comprise one or more first anchors extending from an inner surface of the process vessel into the first layer and a plurality of second anchors, the second anchors comprising the bifurcated anchors extending from the internal surface of the process vessel through the first layer and into the second layer of the double-layered lining adjacent the first layer wherein said plurality of bifurcated anchors have a bifurcation disposed within the second layer.

The anchoring system of some embodiments of the present invention provides a reduction in the tensile stress on the anchors that extend into the hot face layer. Whilst the anchoring system of the present invention may impose relatively high tensile stresses on the first anchors, these are located in a non-critical area where the temperature is lower and the consequences of failure not so significant.

The anchoring system of the present invention may be used in a variety of process vessels such as those used in the production of petroleum, petrochemicals, in mineral processing, alumina, and other industries. The refractory system may be used to line the internal surface or shell of the process vessel.

The internal surface of the process vessel may be configured to receive the anchors. In one embodiment, the internal surface of the process vessel may have sleeves attached thereto for receiving the refractory anchors. In another embodiment, the internal surface of the process vessel may have recesses, lugs or other attachments for affixing the refractory anchors.

The first layer of the double layered lining is typically an insulation layer which may be configured to provide the desired thermal properties for the process vessel. In a typical configuration, the insulation layer may be from 50 to 150 mm in thickness. The first layer may be formed from a refractory concrete or the like. The composition of the first layer is not narrowly critical to the present invention.

In the construction of a lined process vessel according to the present invention, the first anchors and the bifurcated second anchors are attached to the internal surface of the process vessel and the first layer is cast to the desired thickness, preferably covering the first anchors such that the first layer is supported against the internal surface of the process vessel.

The shape of the first anchors may be selected for convenience. We have found it to be desirable to use first anchors having a vee shape. Preferably the angle between the arms of the vee shaped first anchor is acute.

The second layer of the double layered lining is typically a hot face layer and is cast over the first layer so that the bifurcated second anchors are embedded within the hot face layer, preferably at least 25 mm below the surface thereof. We have found that by providing a second layer that is segmented, the tensile stressors on the second anchors may be reduced. It is preferred that the second layer is segmented into squares or rectangles corresponding to the distribution of the second anchors in the array of anchors in the anchoring system. It is preferred that the second layer is segmented into squares having dimensions ranging from approximately 200 mm by 200 mm up to 1000 mm by 1000 mm.

The bifurcated second anchors extend from the shell of the process vessel through the first layer and into the second layer of the double layered lining. The second anchors have bifurcations, or a branching, which is disposed within the second layer. The branches of the bifurcated second anchor may be angled for convenience. However it is preferred that the branches of the bifurcated second anchor form an obtuse angle.

In the anchoring system of the present invention, it is preferred that the first anchors and the bifurcated second anchors are arranged in a regular array in which the first anchors are interposed between the bifurcated second anchors. Preferably the centre to centre dimensions between the bifurcated second anchors is approximately 200 mm.

The anchors may be made from any convenient material of construction. The materials of construction will generally be selected based upon the operating conditions in the process vessel. The selection of materials for anchors for monolithic linings is generally based on temperature. This means that the higher the process gas temperature the more exotic the alloy is used. The most common steel alloy selected for conditions greater than 1000° C. is 310 stainless steel (310ss). However, other alloy steels include 253 MA, Incoloy DS, Inconel 601, may also be used. The present invention encompasses the use of any material from which refractory anchors may be conventionally made within its scope.

While 310ss has a high scaling temperature in an oxidizing atmosphere, reported to be 1150° C., it is well known that his alloy suffers from sigma phase formation in the temperature range of 550° C. to 900° C. Sigma phase affects the steel in two ways, one, it lowers the oxidation resistance (as the chromium has been removed from solution) and two, significantly lowers the impact resistance at temperatures below 200° C. However, the other alloy steels also have a scaling temperature equal to or less than 310ss.

Special Metal Corporation [SMC-097] claim that Alloy DS is resistant to sigma phase embrittlement and can be heated indefinitely within the 600-900° C. range without fear or can operate at higher temperatures without sigma phase formation. However, our research has shown that Alloy DS can form a chromium phase complex similar to sigma phase.

Whilst there has been considerable emphasis placed on refractory anchor selection by using the scaling temperature of the material in an oxidizing atmosphere, we have found that to select a steel on scaling temperature alone can lead to premature failure of the refractory system because this selection criteria does not adequately consider creep or thermal induced strain (thermal load). We have found that the refractory anchoring system of the present invention acts to reduce the effects of creep rupture and thermal induced load on the refractory anchors. Analysis of anchors systems has found that creep rupture stress is very critical due to the low level stress applied at high temperatures.

Creep rupture is associated with static structures where the stress on the anchor is low but constant. The stress can be either due to self-weight of the refractory concrete layers and/or thermal strain. We have found that by understanding creep failure, a better structural life prediction can be made and the probability of catastrophic failure can be reduced.

The creep rupture stress for 310ss, Alloy DS and Inconel 601, used for refractory anchors is a function of time. The creep rupture stress for Inconel 601 and 310ss after 35,040 hours at 1100° C. varies from 2.8 MPa and 1.4 MPa, respectively. The temperature has a significant effect on the creep rupture stress. For example, the creep rupture stress for Inconel 601 at 9,636 hours decreases from 7.7 MPa at 980° C. to 3.4 MPa at 1150° C.

The stress on a refractory anchor increases with time in many environments due to loss of thickness by oxidation of the steel at temperature in an oxidizing environment corrected for the effect of castable on oxidation rate. It is assumed that the oxidation of the steel progresses evenly along the anchor and at a slower rate than in air. The corrosion rate of 310ss, Inconel 601 and DS alloy are similar. However, process conditions can significantly vary the corrosion rate.

The creep rupture stress (CRS) is related to time and temperature by the Larsen Millar Parameter (LMP) for some steel alloys used for refractory anchors, e.g. 310ss, Alloy DS and Inconel 601. The results are based on published data and care must be taken when using the data outside the published range. The predicted CRS for 253MA and DS alloy refractory anchors after 30,000 hours at 1050° C. is 4 MPa and 1.5 MPa, respectively, with no corrosion of the steel. If corrosion, due to oxidation, of the anchor steel at 1050° C. is taken into consideration then the time to failure is estimated at ~7,000 hours for the 253MA steel and ~9,000 hours for the DS alloy anchor. Increasing anchor exposure temperature to 1100° C. can significantly reduce the life from tens of thousands of hours to thousands of hours. If the load on an anchor is increased by changing the material (hot face) density from 2300 kg/m$^3$ to 3000 kg/m$^3$, for example, then the stress on an anchor (253MA) will also increase by 30%. This means the life of an anchor due to creep rupture stress decreases from ~30,000 hours to ~8,000 hours. Or if the refractory (hot face) is increased by 7.7%, i.e. an extra 10 mm, it means the life of the anchor (253MA) will decrease from ~30,000 hours to ~20,000 hours. However, numerical analysis using ATENA (a modelling package using non-linear fracture mechanics) has found that this simple linear elastic load check is inaccurate.

Alloy 601 has a superior creep rupture stress compared to 310ss and Incoloy DS Alloy. In simple terms the life of an anchor could be theoretically extended to >40,000 hours by using this alloy (601). However, it is also known that this material is very susceptible to corrosion in sulphur environments due to the high nickel content.

Using the creep rupture stress data it has been calculated that the rupture stress for an 8 mm 310 stainless steel anchor subject to an axial stress of 1.16 MPa the life is approximately 28,000 hours (3 years) at 1050° C. If corrosion is considered then the anchor life can be reduced to approx ~16,000 hours (~1.9 years).

It was found that moving the bifurcation of the anchor vee above the interface between the insulation layer and the hot face layer the anchor tensile stress due to material weight will be lowered. It was further found that including a smaller anchor in between the larger anchors will transfer some of the stress from the larger anchor to the smaller anchor. It is possible to replace the small vee anchors with metal stiffener plates. The metal stiffener plates may be welded to the shell at a spacing of at least 1 m apart and placed at right angles to each other. The use of the metal stiffener reduces the bowing in the structure due to thermal expansion. Suitably, the depth of the metal stiffener is at least 50% of the insulation layer (throughout this specification, the insulation layer is also referred to as the first layer). Also by segmenting the "hot face" into blocks of 200×200 squares to a maximum of 1000 mm the anchor tensile stress will be lowered. The end result is that the tensile stress on the larger bifurcated anchor can be significantly lowered. For a dense concrete hot face (3000 kg/m$^3$) with large anchors 10 mm in diameter and stiffening plates welded to the shell, the tensile stress on the large anchor has been reduced to less than 1 MPa as compared to 23 MPa in a design that employs only refractory anchors that are Y-shaped and have a bifurcation of the anchor at or below the interface.

The lining system analysed represents a general worst case position and a refractory lining system and using materials of a lower density will have lower tensile stresses on the anchors.

In accordance with a second aspect of the present invention there is provided a lining for a process vessel comprising a first layer positioned adjacent to an inner surface of the process vessel and a second layer positioned adjacent to the first layer, the lining having a plurality of bifurcated anchors extending from the internal surface of the process vessel through the first layer and into the second layer of the double-layered lining adjacent the first layer wherein said plurality of bifurcated anchors have a bifurcation disposed within the second layer.

In some embodiments, the anchors are disposed in the lining such that the bifurcation point (as measured from the anchor vertex) is positioned in the second layer at a distance away from the interface between the first layer and the second layer, with the distance being equivalent to at least 15% of the thickness of the second layer, more preferable from 15% to 75% of the thickness of the second layer. It is also desirable that the tips of the anchor (or indeed, any part of the anchor that is located furtherest away from the inner surface of the process vessel) are positioned below the exposed surface of the second layer at a distance of at least 20% of the thickness of the second layer away from the exposed surface of the second layer.

In some embodiments, the lining further comprises one or more stiffeners mounted to the inner surface of the process vessel. The stiffeners may comprise one or more stiffening plates extending from the inner surface of the process vessel into the first layer. The one or more stiffeners may be mounted to the inner surface of the process vessel, for example, by welding. The stiffeners may extend into the first layer for a distance equivalent to at least 50% of the depth of the first layer. In some embodiments, the stiffeners may extend into the second layer. The stiffeners may comprise stiffening plates welded to the inner surface of the process vessel at right angles to each other and at a spacing of at least 1 m apart. In other words, in this embodiment, the stiffening plates may form a generally rectangular or square grid on the inner surface of the process vessel, the squares or rectangles defined by the stiffening plates having a maximum width or length of 1 m.

In other embodiments, the lining may comprise a plurality of anchors extending into the first layer but not extending into the second layer.

The second layer may also be segmented into rectangular or square blocks having a width or length of from 200 mm to of 1000 mm. Suitably, the second layer is segmented into square blocks having dimensions ranging from approximately 200 mm by 200 mm to 1000 mm by 1000 mm.

The anchors may be attached to the process vessel in such a manner to ensure that good heat transfer from the anchors is obtained. In this regard, heat transfer along the anchor to the shell of the process vessel is desirably maximised to facilitate lowering of the temperature of the anchor or anchor stem near the interface between the first layer and the second layer. To obtain good heat exchange, for example, the anchor may be welded to the outer shell of the process vessel or the anchor may be mounted in a mounting clip that is attached to the shell and a heat transfer compound applied to the clip. These arrangements may reduce the temperature of the anchor at or near the interface of the first and second layers by 100 to 150°

C. A lowering by this amount is significant in terms of creep rupture because the creep rupture stress increases logarithmically with temperature, meaning that a small reduction in temperature corresponds to a large reduction in creep rupture stress.

In order to reduce or lower any bending stresses applied to the anchor, a layer of a compressible material may be applied to the anchor. The compressible material may desirably be a non-combustible compressible material. An example of a suitable material may comprise ceramic fibres. The ceramic fibres may be held in place using an appropriate tape or other wrapping. The compressible material may be positioned on the anchor in the vicinity of the first layer. The compressible material may extend along only part of the anchor. The compressible material may extend along substantially or off the length of the anchor in the first layer. Alternatively, the compressible material may extend along only part of the length of the anchor in the first layer.

BRIEF DESCRIPTION OF THE DRAWINGS

In order that the various aspects of the invention may be more fully understood and put into practical effect, a number of preferred embodiments will be described with reference to the accompanying drawings, in which.

DETAILED DESCRIPTION OF THE DRAWINGS

Figure 1:
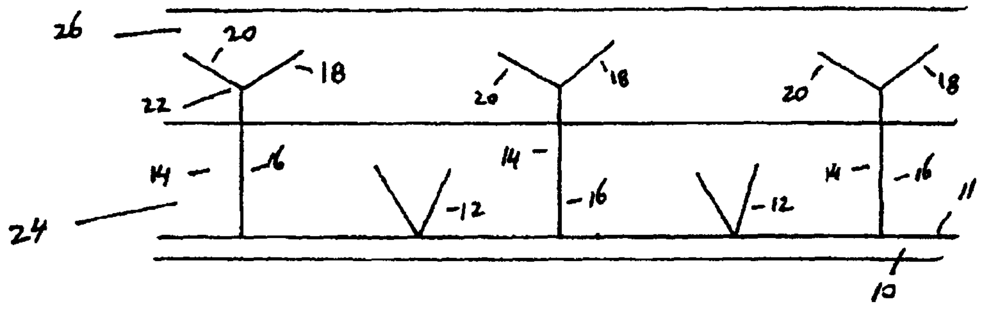
FIG. 1 shows side schematic view showing an anchoring system and lining in accordance with one embodiment of the present convention.

It will be appreciated that the drawings have been provided for the purposes of illustrating embodiments of the present invention. Thus, it will be understood that the present invention should not be considered to be limited to the features as shown in the drawings.

FIG. 1 shows a side schematic view of an anchoring system and lining in accordance with an embodiment of the present invention. In FIG. 1, the outer shell 10 of a process vessel, which is typically made of a metal, such as steel, has a plurality of first anchors 12 affixed to inner surface 11 thereof. The outer shell 10 also has a plurality of second anchors 14 affixed to the inner surface 11 thereof. Each of the plurality of second anchors includes a stem 16 and bifurcated arms 18, 20. The bifurcated arms extend essentially from bifurcation point 22.

In FIG. 1, the lining further includes a first layer of an insulating lining 24. The first layer 24 is located adjacent to the inner surface 11 of the outer shell 10. A second layer 26 of dense concrete (hotface) is then located over the first layer 24. The second layer 26 may, for example, be a layer of insulating or more dense concrete that, in use, forms the hot face inside the process vessel. It will be understood that the second layer 26 is exposed to the high processing temperatures experienced during operation of the process vessel.

As can be seen from FIG. 1, the ends of bifurcated arms 18, 20 do not extend all the way to the exposed surface of the second layer 26. In this manner, the hotface layer 26 provides protection to the bifurcated arms from the high temperatures experienced inside the process vessel during use of the process vessel.

As can also be seen from FIG. 1, the bifurcation point 22 is located such that bifurcation point 22 is disposed within the second layer 26.

Figure 2:
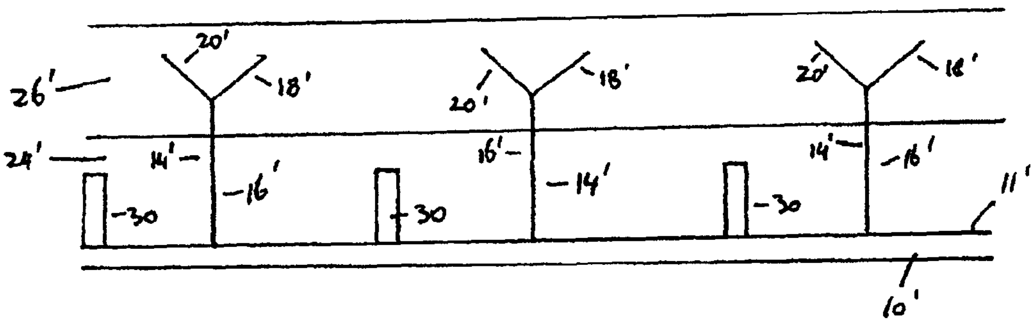
FIG. 2 shows a side schematic view showing an anchoring system and lining in accordance with another embodiment of the present invention.

FIG. 2 shows a side schematic view of an anchoring system and lining in accordance with another embodiment of the present invention. The embodiment of FIG. 2 includes a number of features that are common with the embodiment shown in FIG. 1 and, for convenience, those common features in FIG. 2 are denoted by the same reference numerals as used in FIG. 1, but with the addition of a'. These features need not be described further. Where the embodiment shown in FIG. 2 differs from that shown in FIG. 1 is that, rather than having the first anchors 12 as shown in FIG. 1, the embodiment shown in FIG. 2 has a plurality of stiffening plates 30. The stiffening plates 30 are welded to the inner surface 11' of the wall of the process vessel 10'. The stiffening plates 30 also include other stiffening plates that extend at right angles to the stiffening plates 30 shown in FIG. 2. These additional stiffening plates are not shown in FIG. 2 for clarity. However, the person skilled in the art will appreciate that the stiffening plates 30 and the additional stiffening plates (not shown) form a generally grid-like pattern on the inner surface of the process vessel 10'. The squares or openings defined in the grid-like pattern suitably have a minimum opening of at least one of metre between opposed stiffener plates that define opposed walls of the grid openings.

Figure 3:
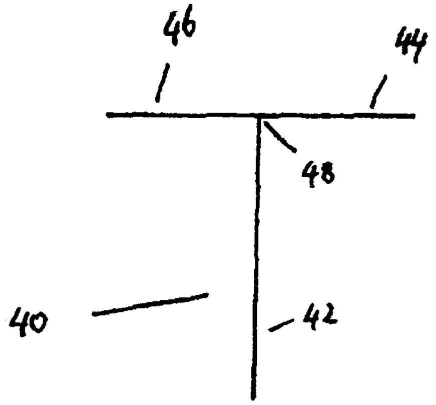
FIG. 3 is a side schematic view showing an embodiment of a bifurcated anchor suitable for use in the present invention.

FIG. 3 shows a schematic view of an alternative bifurcated anchor for use in the present invention. In FIG. 3, the anchor 40 comprises a stem 42 having a first arm 44 and a second arm 46. Arms 44 and 46 extend essentially at right angles to the stem 42. Accordingly, arms 44 and 46 are essentially collinear. The anchor 40 shown in FIG. 3 may be described as a "T" shaped anchor. The bifurcated point 48 of the anchor 40 shown in FIG. 3 is positioned such that it lies within the second layer of insulation in the finished wall lining.

Figure 4:
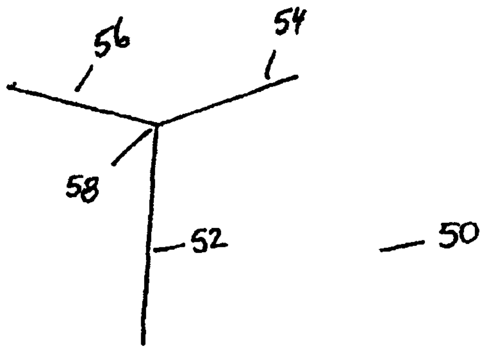
FIG. 4 is a side schematic view showing another embodiment of a bifurcated anchor suitable for use in the present invention.

FIG. 4 shows an alternative anchor suitable for use in the present invention. The anchor 50 shown in FIG. 4 has a stem 52, a first bifurcated arm 54 and a second bifurcated 56. The arms 54, 56 extend outwardly from bifurcation point 58. Bifurcation point 58 is positioned in the second layer of insulation in the finished wall lining. Anchor 50 shown in FIG. 4 is similar to anchor 14 shown in FIG. 1, except that the bifurcated arms of anchor 50 form a more obtuse angle than the bifurcated arms of the anchor 14.

The anchor shown in FIG. 4 may be more suitable for use in the present invention than the anchor shown in FIG. 3. The arms 44, 46 of the anchor shown in FIG. 3 are bent to extend at a right angle to the stem 42 of the anchor. In contrast, the arms 54, 56 of the anchor 50 shown in FIG. 4 are bent to an angle that is less than a right angle to the stem 52. This acts to lower the cold stress that the bending or pinching of the anchor causes at that point during manufacture of the anchor, which may result in a stress razor in the anchor shown in FIG. 3.

Figure 5:
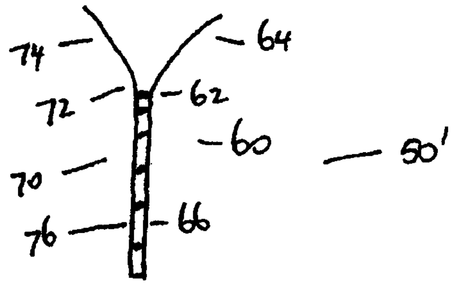
FIG. 5 is a side schematic view showing a more detailed view of a bifurcated anchor suitable for use in the present invention.

FIG. 5 shows a more detailed view of the anchor 50 shown in FIG. 4. The anchor 50' shown in FIG. 5 includes a first wire 60 that is bent at bifurcation point 62 to form arm 64 and stem portion 66. The anchor 50' also includes a second wire 70 that is bent at bifurcation point 72 to form arm 74 and stem portion 76. In order to complete construction of the anchor 50' shown in FIG. 5, the stem portions 66 and 76 are joined together, for example, by welding. Although not shown in FIG. 5, the anchor 50' may also include a small selection extending perpendicularly from the lower end of stem portions 66 and 76 to enable the end portions to be easily mounted to the inner surface of the process vessel.

FIGS. 6 to 9 show various models of embodiments of anchoring systems and refractory linings in accordance with embodiments of the present invention, including results obtained by ATENA modelling of those arrangements.

Figure 6:
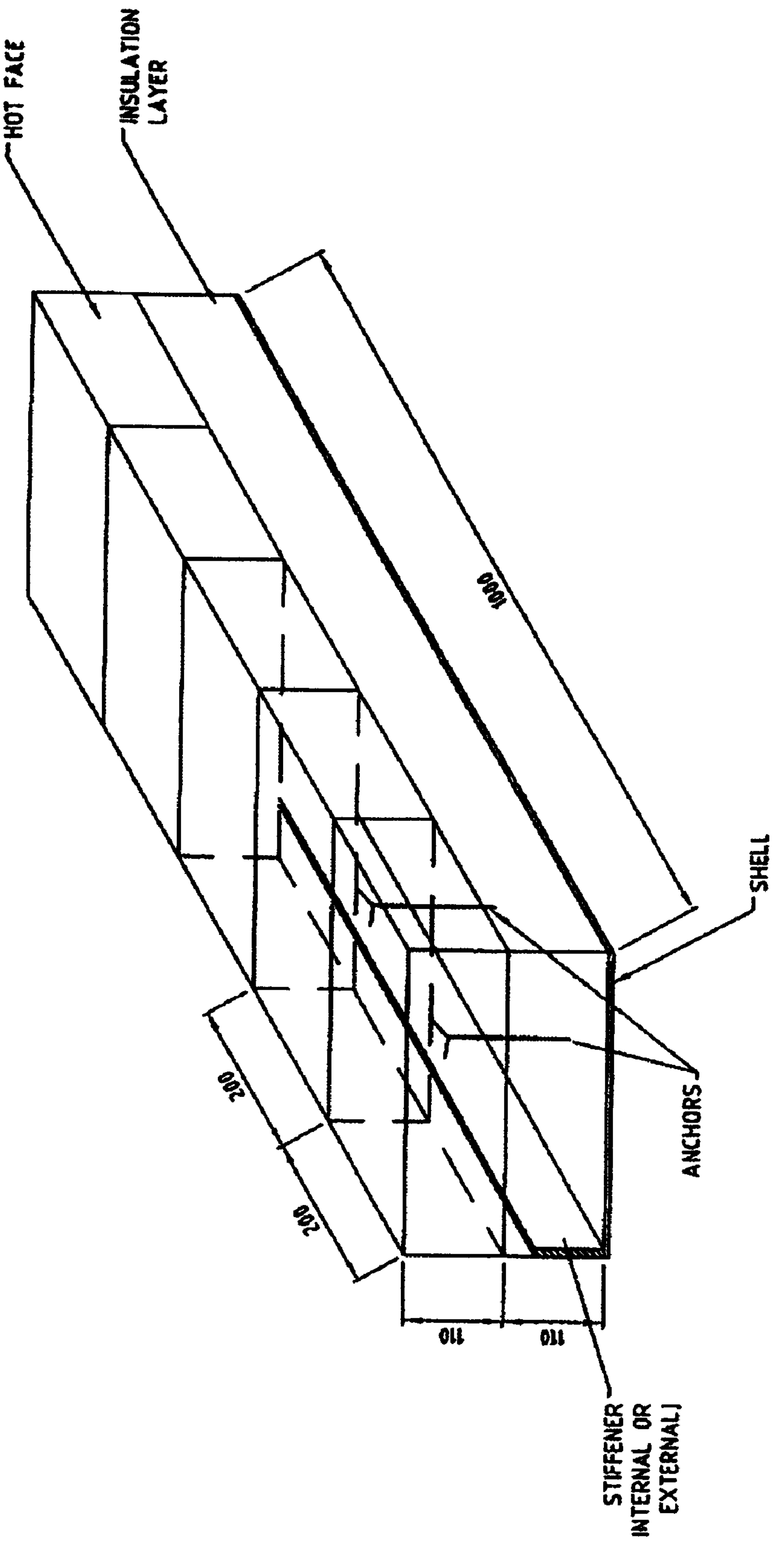
FIG. 6 shows a schematic view of a lining in accordance with an embodiment of the present invention showing anchor shape and refractory lining construction.

In FIG. 6, the bifurcation point of the anchor is positioned well above the interface between the first and second insulating layers. The second layer or "hot face" layer has been segmented into squares of dimensions 200 mm by 200 mm. Expansion lines have been cut into the insulating layer or the first layer. It has been found that these steps will lower the tensile stress on an anchor. It was found that the additional small vee anchors in the first layer can reduce the tensile stress on the longer anchors that arise due to material weight only. It was further found that replacing the small anchors with metal stiffening plates welded to the shell (as shown in FIG. 6) will lower or control the anchor tensile stresses that arise due to thermal loads. The end result is that the tensile stress on the large anchor can be significantly lowered.

Figure 7:
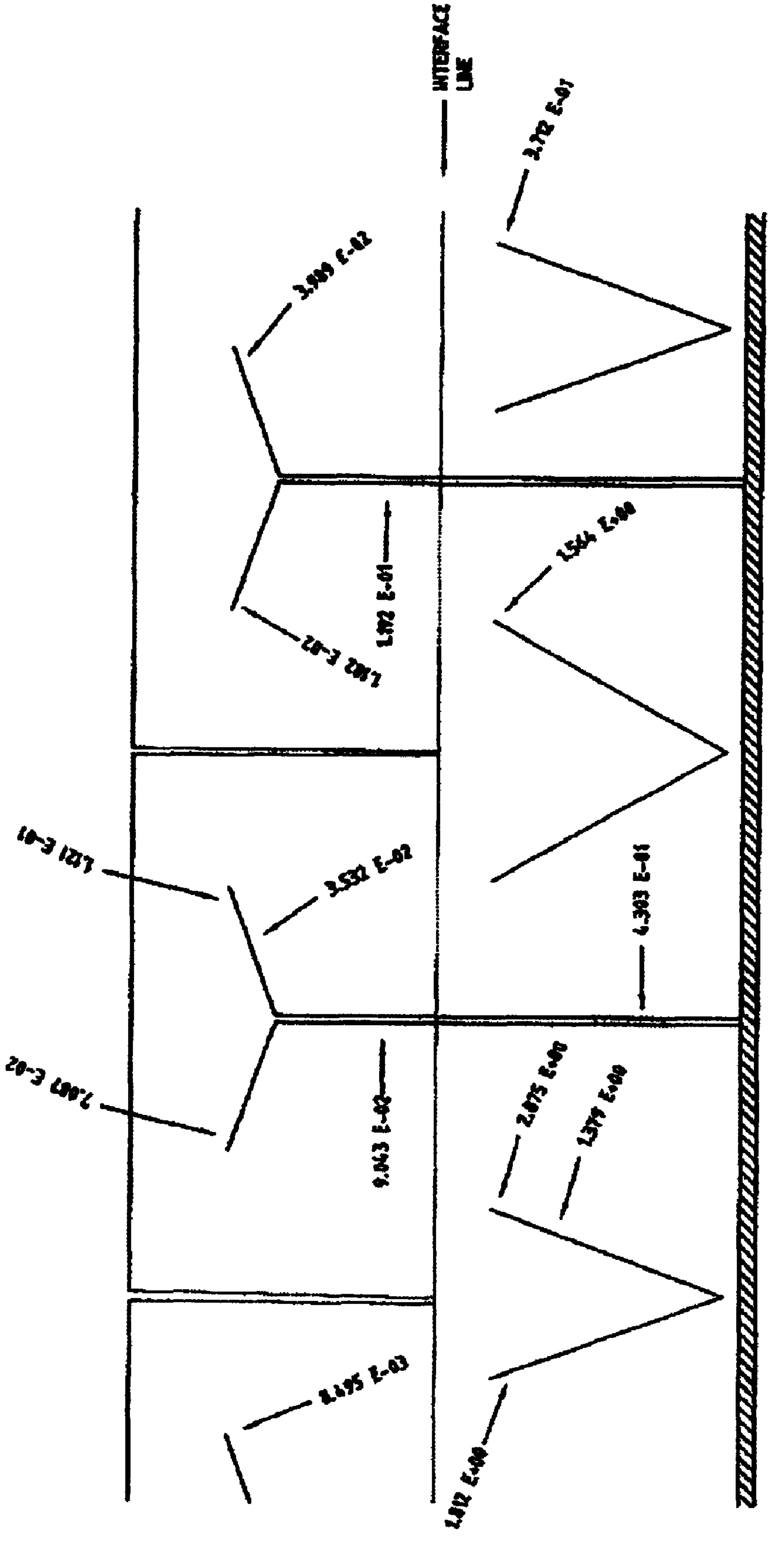
FIG. 7 shows a side schematic view of an ATENA axisymmetric model of an anchor design (1 m section) in accordance with an embodiment of the present invention for a refractory lining showing displacements and anchor stresses due to gravity load. Material density 3000 kg/m$^3$ and anchor diameter large 10 mm, small 8 mm.

FIG. 7 shows the actual stresses on the anchors due to a gravity load for a dense concrete hot face (3000 kg per cubic metre) with large anchors, 10 mm in diameter and small anchors in the first layer of 8 mm diameter. When compared with existing anchor systems, the tensile stress on a large anchor has been reduced to approximate 1 MPa as compared to approximately 13 MPa in conventional designs.

In making the changes as shown in FIG. 7, it was found that axial tensile stress in the small vee anchors has increased to a value of approximately 6 MPa in some places. However, this anchor is in a lower temperature zone (as it is located further away from the hot face) where creep rupture stress and yield stress are much higher. These small anchors are also in a non-critical area where failure at a point near the tip will not affect the integrity of the hot face lining.

Figure 8:
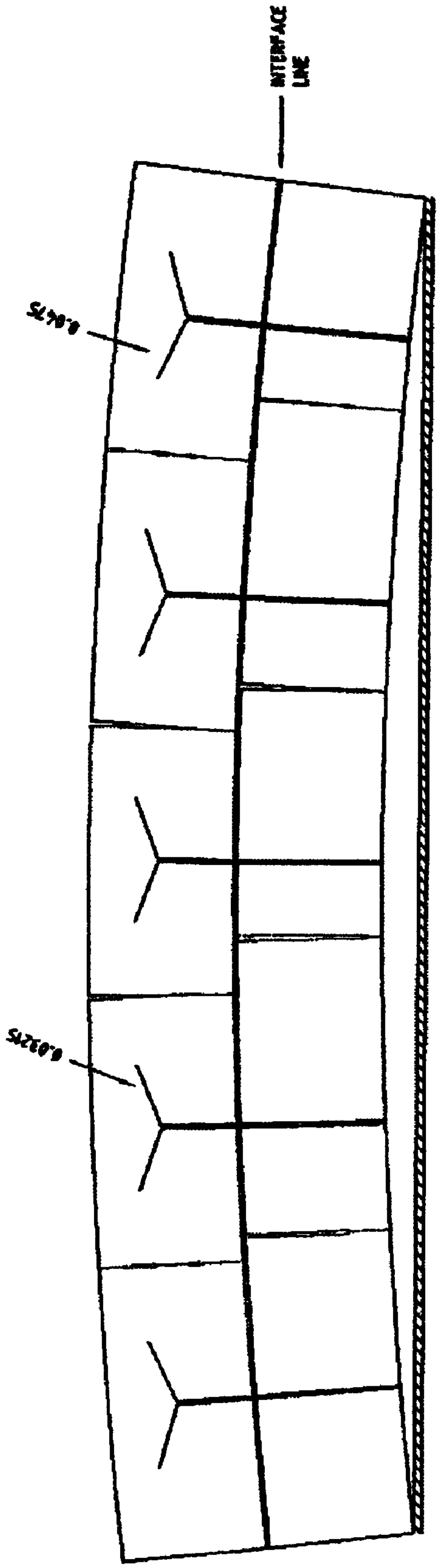
FIG. 8 shows a side schematic view of an ATENA model of an anchor design (1 m section) in accordance with an embodiment of the present invention for a refractory lining with block hot face and cuts in the insulation showing displacements and axial anchor stresses due to temperature and gravity loads. Material density 3000 kg/m$^3$ and anchor diameter large 10 mm.

FIG. 8 shows a 1 m long section with the hot face broken into blocks and allowed to fully expand, with cuts added to the first layer of insulating material. The shell of the process vessel is fixed at each end and allowed to bow due to thermal expansion. The cuts in the first layer have spacing of approximately every 200 mm. The analysis shows that the anchor axial tensile stress around the interface between the first layer in the second layer is below the creep rupture stress for most alloys used to refractory linings, at temperatures less than or equal to 1150° C.

Figure 9:
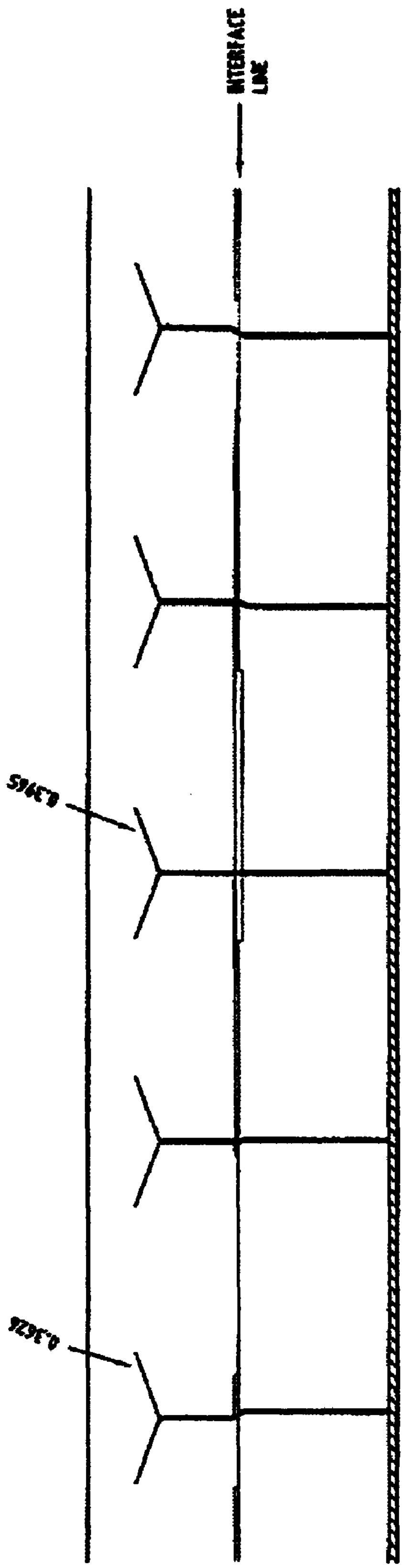
FIG. 9 shows a side schematic view of an ATENA model of an anchor design for a 1 m long refractory lining in accordance with the present invention showing displacements and axial anchor stresses due to temperature and gravity loads. The hot face and insulation layers can freely expand. Material density 3000 kg/m$^3$ and anchor diameter large 10 mm. The shell has been fixed to represent the presence of steel stiffeners.

FIG. 9 shows a 1 m long section of hot face and insulation, with the hot face being allowed to fully expand. The first layer of insulation has no expansion cuts but is restrained at each end as if contained by a metal stiffener welded to the shell. The shell is held in place along its length as if there stiffness in both directions, which will induce some bowing due to thermal expansion.

FIGS. 8 and 9 represent the worst cases for anchor tensile stress, i.e. free expansion of the hot face and a bowing of the structure due to thermal expansion. The analysis shows that the anchor tensile stress around the interface between the first layer and the second layer is below the creep rupture stress for most refractory alloys used to refractory linings at temperatures less than or equal to 1150° C.

In designing anchoring systems and wall linings in accordance with the present invention, it will be understood that as the second layer (the hot face layer) increases in thickness, the anchor diameter must increase. As the density or elastic modulus of the first layer (or insulating layer) decreases, then the anchor diameter must increase. The panel size in the second layer can increase in a vertical wall position, when compared to a roof position.

The present inventor has also found that coating a lower section of the anchor stems in the first layer with a soft coating to allow lateral movement of the anchor in the insulating layer may also have a beneficial effect. The lower section of the anchor stems may be coated with a plastic membrane, for example. Further, placing cuts in the first layer to a depth of at least 50% of the thickness of the first layer, assists in controlling cracking and reducing thermal expansion stress. The cuts may be approximately 2 mm to 4 mm wide and they may be spaced 200 to 500 mm apart.

In a most preferred embodiment of the present invention, the process vessel has metal stiffening plates welded to the shell, either on the inside or the outside (but preferably on the inside of the shell) to stop flexing or deformation of the shell and to control expansion of the first layer. The stiffening plates may have a depth of at least 50% of the thickness of the insulating layer and may extend into the hot face layer. The stiffening plates may be oriented at right angles to each other and at a spacing not greater than 1 m apart. The second layer (or hot face layer) may be formed as a series of panels in the shape of blocks having dimensions from 200 mm by 200 mm up to 1000 mm by 1000 mm. The hot face layer (or second layer) may also have expansion joints such that the second layer is compressed at the design or operating temperature.

Figure 10:
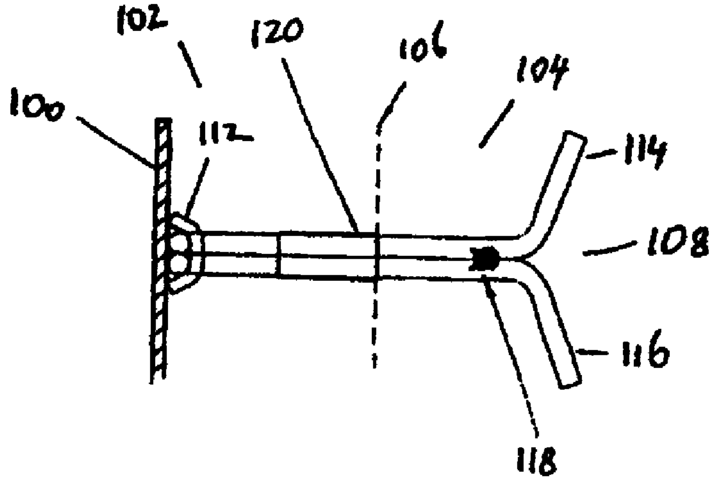
FIG. 10 shows a top view of an anchoring system in accordance with another embodiment of the present invention.
Figure 11:
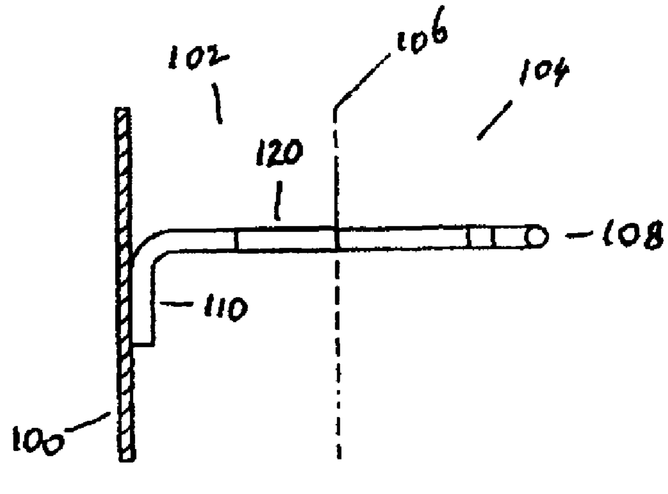
FIG. 11 shows a side view of the anchoring system shown in FIG. 10.

FIGS. 10 and 11 show of use of an anchoring system in accordance with another embodiment of the present invention. In FIGS. 10 and 11, a furnace having a steel shell 100 is fitted with a lining having a first layer 102 and a second layer 104. An interface 106 exists between first layer 102 and second layer 104.

An anchor 108 is provided in order to assist in holding the furnace lining in position. The anchor 108 is mounted by a leg 110 that is fitted into a saddle 112. Saddle 112 has been omitted from FIG. 11 for clarity. Other methods of mounting the anchor 108 to the furnace may also be provided. For example, the anchor 108 may be bolted to the steel shell 100. The anchor 108 may extend through the steel shell 100. The anchor 108 may be welded to the steel shell 100.

As can be seen in FIG. 10, anchor 108 includes bifurcated arms 114, 116. The point of bifurcation is positioned away from the interface 106 and within the second layer 104 of the lining. The outer edge of the second layer 104 of the lining is not shown in FIGS. 10 and 11 but it will be appreciated that the second layer 104 extends inwardly into the furnace past the ends of the anchor 108 so that the ends of the anchor 108 are protected from the hot contents of the furnace.

The anchor 108 may be manufactured from two separate rods bent or formed to the appropriate shape. A weld 118 may be used to hold the rods together. Additional welds may be used in the manufacture of the anchor.

In order to reduce or lower any bending stresses applied to the anchor 108, a layer of a compressible material 120 is applied to the anchor 108. The compressible material 120 is desirably a non-combustible compressible material. An example of a suitable material may comprise ceramic fibres. The ceramic fibres may be held in place using an appropriate tape or other wrapping. The ceramic material may be positioned on the anchor in the vicinity of the first layer 102. The ceramic material may extend along only part of the anchor, as shown in FIGS. 10 and 11.

Those skilled in the art will appreciate that the present invention may be subject to variations or modifications other than those specifically described. It will be understood that the invention encompasses all such variations and modifications that fall within its spirit and scope.

The invention claimed is:

1. An anchoring system for supporting a double-layered refractory lining of a process vessel comprising a first layer positioned adjacent to an inner surface of the process vessel and a second layer positioned adjacent to the first layer, wherein the anchoring system comprises a plurality of bifurcated anchors extending from the internal surface of the process vessel through the first layer and into the second layer of the double-layered lining adjacent the first layer wherein said plurality of bifurcated anchors have a bifurcation disposed within the second layer, and wherein the bifurcation point as measured from the anchor vertex is positioned in the second layer at a distance away from the interface between the first layer and the second layer, with the distance being equivalent to from 15% to 75% of the thickness of the second layer.

2. An anchoring system as claimed in claim 1 wherein the tips of the anchor are positioned below the exposed surface of the second layer at a distance of at least 20% of the thickness of the second layer away from the exposed surface of the second layer.

3. An anchoring system for supporting a double-layered refractory lining of a process vessel comprising a first layer positioned adjacent to an inner surface of the process vessel and a second layer positioned adjacent to the first layer, wherein the anchoring system comprises a plurality of bifurcated anchors extending from the internal surface of the process vessel through the first layer and into the second layer of the double-layered lining adjacent the first layer wherein said plurality of bifurcated anchors have a bifurcation disposed within the second layer, the anchoring system further comprising a plurality of other anchors extending from an inner surface of the process vessel into the first layer.

4. An anchoring system as claimed in claim 3 wherein a bifurcation point (as measured from the anchor vertex) is positioned in the second layer at a distance away from the interface between the first layer and the second layer, with the distance being equivalent to from 15% to 75% of the thickness of the second layer and wherein the tips of the anchor or any part of the anchor that is located furtherest away from the inner surface of the process vessel are positioned below the exposed surface of the second layer at a distance of at least 20% of the thickness of the second layer away from the exposed surface of the second layer.

5. An anchoring system for supporting a double-layered refractory lining of a process vessel comprising a first layer positioned adjacent to an inner surface of the process vessel and a second layer positioned adjacent to the first layer, wherein the anchoring system comprises a plurality of bifurcated anchors extending from the internal surface of the process vessel through the first layer and into the second layer of the double-layered lining adjacent the first layer wherein said plurality of bifurcated anchors have a bifurcation disposed within the second layer, the anchoring system further comprising one or more stiffeners mounted to the inner surface of the process vessel.

6. An anchoring system as claimed in claim 5 wherein a bifurcation point (as measured from the anchor vertex) is positioned in the second layer at a distance away from the interface between the first layer and the second layer, with the distance being equivalent to from 15% to 75% of the thickness of the second layer and wherein the tips of the anchor or any part of the anchor that is located furtherest away from the inner surface of the process vessel are positioned below the exposed surface of the second layer at a distance of at least 20% of the thickness of the second layer away from the exposed surface of the second layer.

7. An anchoring system for supporting a double-layered refractory lining of a process vessel comprising a first layer positioned adjacent to an inner surface of the process vessel and a second layer positioned adjacent to the first layer, wherein the anchoring system comprises a plurality of bifurcated anchors extending from the internal surface of the process vessel through the first layer and into the second layer of the double-layered lining adjacent the first layer wherein said plurality of bifurcated anchors have a bifurcation disposed within the second layer comprising a combination of anchors and stiffening plates, the stiffening plates extending from an internal surface of the process vessel into the first layer of the double-layered lining adjacent the internal surface of the process vessel and the anchors comprising one or more first anchors extending from an inner surface of the process vessel into the first layer and a plurality of second anchors, the second anchors comprising the bifurcated anchors extending from the internal surface of the process vessel through the first layer and into the second layer of the double-layered lining adjacent the first layer wherein said plurality of bifurcated anchors have a bifurcation disposed within the second layer.

8. An anchoring system as claimed in claim 7 wherein a bifurcation point (as measured from the anchor vertex) is positioned in the second layer at a distance away from the interface between the first layer and the second layer, with the distance being equivalent to from 15% to 75% of the thickness of the second layer and wherein the tips of the anchor or any part of the anchor that is located furtherest away from the inner surface of the process vessel are positioned below the exposed surface of the second layer at a distance of at least 20% of the thickness of the second layer away from the exposed surface of the second layer.

9. A lining for a process vessel comprising a first layer positioned adjacent to an inner surface of the process vessel and a second layer positioned adjacent to the first layer, the lining having a plurality of bifurcated anchors extending from the internal surface of the process vessel through the first layer and into the second layer of the double-layered lining adjacent the first layer wherein said plurality of bifurcated anchors have a bifurcation disposed within the second layer, and wherein the bifurcation point (as measured from the anchor vertex) is positioned in the second layer at a distance away from the interface between the first layer and the second layer, with the distance being equivalent to from 15% to 75% of the thickness of the second layer.

10. A lining as claimed in claim 9 wherein the tips of the anchor or any part of the anchor that is located furtherest away from the inner surface of the process vessel are positioned below the exposed surface of the second layer at a distance of at least 20% of the thickness of the second layer away from the exposed surface of the second layer.

11. A lining as claimed in claim 9 wherein the second layer is segmented into rectangular or square blocks having a width or length of from 200 mm to of 1000 mm.

12. A lining as claimed in claim 9 wherein a layer of a compressible material is applied to the anchor.

13. A lining as claimed in claim 12 wherein the compressible material comprises a non-combustible compressible material.

14. A lining as claimed in claim 13 wherein the compressible material is positioned on the anchor in the vicinity of the first layer.

15. A lining as claimed in claim 12 wherein the compressible material is positioned on the anchor in the vicinity of the first layer.

16. A lining for a process vessel comprising a first layer positioned adjacent to an inner surface of the process vessel and a second layer positioned adjacent to the first layer, the lining having a plurality of bifurcated anchors extending from the internal surface of the process vessel through the first layer and into the second layer of the double-layered lining adjacent the first layer wherein said plurality of bifurcated anchors have a bifurcation disposed within the second layer, and wherein the lining further comprises one or more stiffeners mounted to the inner surface of the process vessel.

17. A lining as claimed in claim 16 wherein a bifurcation point (as measured from the anchor vertex) is positioned in the second layer at a distance away from the interface between the first layer and the second layer, with the distance being equivalent to from 15% to 75% of the thickness of the second layer and wherein the tips of the anchor or any part of the anchor that is located furtherest away from the inner surface of the process vessel are positioned below the exposed surface of the second layer at a distance of at least 20% of the thickness of the second layer away from the exposed surface of the second layer.

18. A lining for a process vessel comprising a first layer positioned adjacent to an inner surface of the process vessel and a second layer positioned adjacent to the first layer, the lining having a plurality of bifurcated anchors extending from the internal surface of the process vessel through the first layer and into the second layer of the double-layered lining adjacent the first layer wherein said plurality of bifurcated anchors have a bifurcation disposed within the second layer, and wherein the lining further comprises a plurality of anchors extending into the first layer but not extending into the second layer.

19. A lining as claimed in claim 18 wherein a bifurcation point (as measured from the anchor vertex) is positioned in the second layer at a distance away from the interface between the first layer and the second layer, with the distance being equivalent to from 15% to 75% of the thickness of the second layer and wherein the tips of the anchor or any part of the anchor that is located furtherest away from the inner surface of the process vessel are positioned below the exposed surface of the second layer at a distance of at least 20% of the thickness of the second layer away from the exposed surface of the second layer.

* * * * *